United States Patent
Baden et al.

(10) Patent No.: US 7,911,958 B2
(45) Date of Patent: Mar. 22, 2011

(54) TOKEN BUCKET WITH VARIABLE TOKEN VALUE

(75) Inventors: Eric Baden, Saratoga, CA (US); Jeff Dull, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 171 days.

(21) Appl. No.: 12/119,733

(22) Filed: May 13, 2008

(65) Prior Publication Data

US 2009/0285095 A1 Nov. 19, 2009

(51) Int. Cl.
*G01R 31/08* (2006.01)
*G06F 11/00* (2006.01)
*G08C 15/00* (2006.01)
*H04J 1/16* (2006.01)

(52) U.S. Cl. ........................................ 370/235

(58) Field of Classification Search .............. 370/232, 370/235.1, 412, 260, 253
See application file for complete search history.

(56) References Cited

U.S. PATENT DOCUMENTS

| 6,516,369 | B1 * | 2/2003 | Bredin | 710/111 |
| 2001/0007560 | A1 * | 7/2001 | Masuda et al. | 370/401 |
| 2004/0062259 | A1 * | 4/2004 | Jeffries et al. | 370/412 |
| 2004/0221032 | A1 * | 11/2004 | Bernstein et al. | 709/224 |
| 2007/0223375 | A1 * | 9/2007 | Ohta et al. | 370/230 |

* cited by examiner

*Primary Examiner* — Derrick W Ferris
*Assistant Examiner* — Maharishi Khirodhar
(74) *Attorney, Agent, or Firm* — Brake Hughes Bellermann LLP

(57) ABSTRACT

Various example embodiments are disclosed. According to an example embodiment, a method may include receiving a token count units instruction, periodically increasing or decreasing a token count based at least in part on a refresh rate, and in response to receiving a packet, decreasing or increasing the token count based at least in part on a size of the packet and the instruction.

20 Claims, 5 Drawing Sheets

| Meter Granularity 202 | Refresh Rate 204 | Bucket Count Unit 206 | Bit Position 208 | Maximum Bucket Size 210 | Bucket Size Unit 212 |
|---|---|---|---|---|---|
| 0 | 8,000bps | 1/128 Byte | BC[7] | 2Mbyte | 512byte |
| 1 | 16,000bps | 1/64 Byte | BC[6] | 4Mbyte | 1kbyte |
| 2 | 32,000bps | 1/32 Byte | BC[5] | 8Mbyte | 2kbyte |
| 3 | 64,000bps | 1/16 Byte | BC[4] | 16Mbyte | 4kbyte |
| 4 | 128,000bps | 1/8 Byte | BC[3] | 32Mbyte | 8kbyte |
| 5 | 256,000bps | 1/4 Byte | BC[2] | 64Mbyte | 16kbyte |
| 6 | 512,000bps | 1/2 Byte | BC[1] | 128Mbyte | 32kbyte |
| 7 | 1,024,000bps | 1 Byte | BC[0] | 256Mbyte | 64kbyte |

FIG. 2

TOKEN BUCKET WITH VARIABLE TOKEN VALUE

TECHNICAL FIELD

This description relates to network flow control.

BACKGROUND

In networks, it may be desirable to control or limit the amount of data which may flow through a particular switch. For example, a leaky bucket may impose a hard limit on the data transmission rate of a switch, whereas a token bucket may allow a certain amount of burstiness while imposing a limit on the average data transmission rate.

SUMMARY

Various embodiments are disclosed relating to token buckets.

BRIEF DESCRIPTION OF THE DRAWINGS

FIG. 2 is a table showing refresh rates, bucket count units, bit positions, maximum bucket sizes, and bucket size units based on a meter granularity parameter according to an example embodiment.

DETAILED DESCRIPTION

Figure 1A:
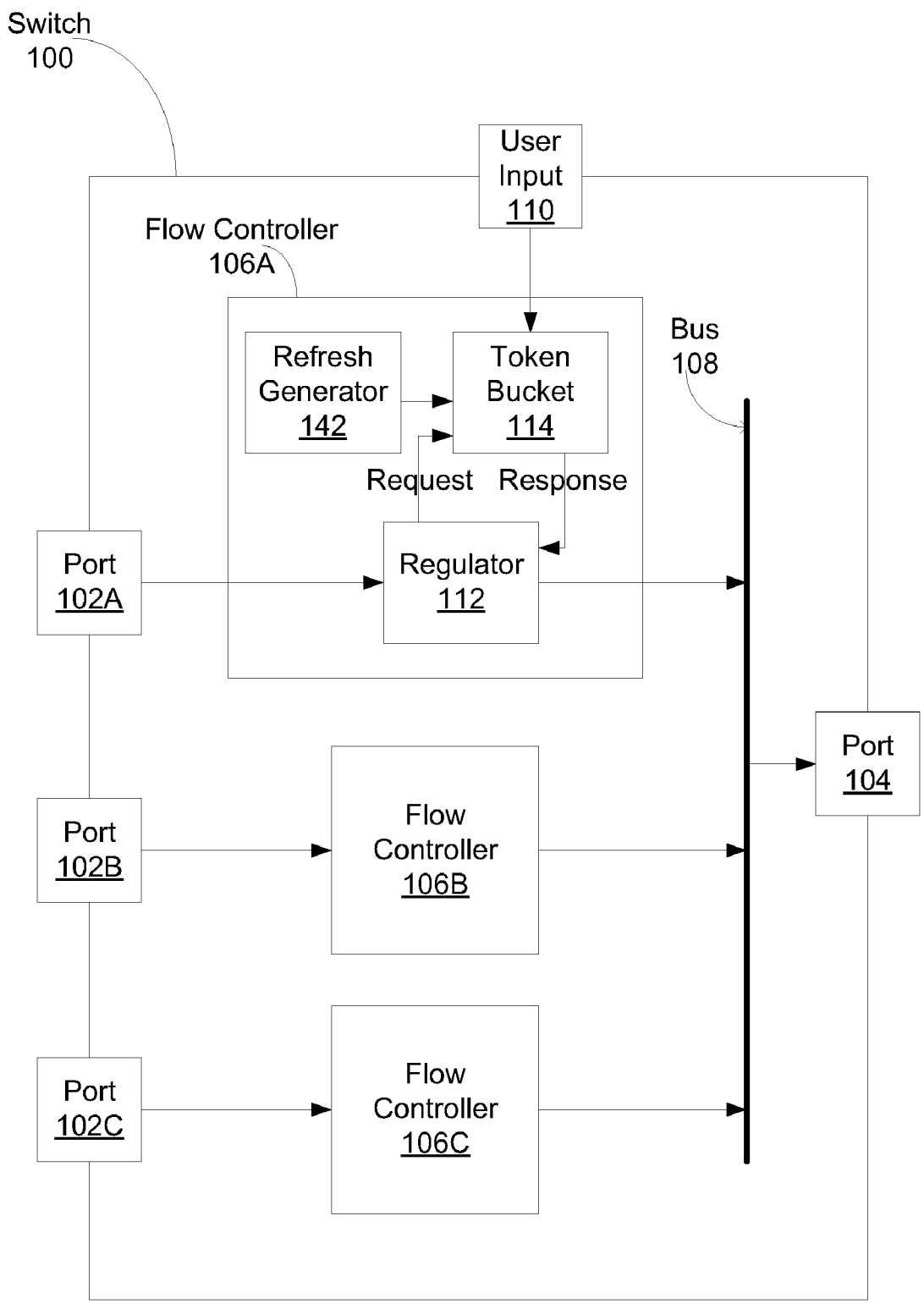
FIG. 1A is a block diagram showing a switch according to an example embodiment.

FIG. 1 is a block diagram of a switch 100 according to an example embodiment. The switch 100 may, for example, include a router or switch configured to receive data. The data may be received in packets. The switch 100 may, for example, receive data from one or more sources, such as via an input port 102A, 102B, 102C. While three input ports 102A, 102B, 102C are included in the example shown in FIG. 1, any number of input ports 102A, 102B, 102C may be included in the switch 100. The switch 100 may also send the data, either in the same packets as received or formatted into a different form, to one or more other network devices (not shown), such as through an output port 104. While one output port 104 is included in the example shown in FIG. 1, any number of output ports 104 may be included in the switch 100. The switch 100 may, for example, multiplex the data through a single output port 104, or may route the data through a plurality of ports.

In an example embodiment, one or more network devices which receive data from the switch 100 may have a limited ability to handle and/or process data received from the switch 100. A network device may, for example, not be able to process data at the same rate at which the switch 100 receives and/or forwards data. It may be desirable for the switch 100 to control the rate at which data flows from the switch 100 to other network devices.

The switch 100 may, for example, include a flow controller 106A, 106B, 106C associated with each input port 102A, 102B, 102C. The flow controller 106A may, for example, control the flow of data received through the input port 102A. For example, the flow controller 106A may receive packets from the input port 102A. The flow controller 106A may also forward packets to the output port 104. In an example embodiment, the flow controller 106A may forward the packets to the output port 104 via a bus 108. The bus 108 may allow multiple flow controllers 106A, 106B, 106C to forward packets to a same output port 104. The flow controllers 106A, 106B, 106C may forward packets to the port 104 via the bus 108 using a medium access control (MAC) protocol, such as the Ethernet protocol specified in IEEE 802.3, according to an example embodiment.

The flow controller 106A may, for example, impose a specified limit on an average data transmission rate for packets forwarded to the output port 104. The flow controller 106A may allow some "bursts" of data to exceed the specified limit. However, if the flow controller 106A forwards more than a specified quantum of data over a period of time, then the flow controller 106A may, for example, begin dropping packets or marking packets as "out of profile."

The flow controller 106A may maintain a "token count," which represents the amount of data which the flow controller 106A may forward and remain "in profile." In an example embodiment, the token count may be represented by a thirty-bit, signed binary number. The flow controller 106A may have a maximum token count or "bucket size." As the flow controller 106A receives packets, the flow controller 106A may reduce the token count. The flow controller 106A may reduce the token count based on a size of the packet. In an example embodiment, the size of the packet may be measured in bytes.

The flow controller 106A may periodically increase the token count according to a "refresh rate." If the token count falls below a threshold, such as zero, then the packets may be considered out of profile, and the flow controller 106A may take actions such as dropping packets or marking packets as out of profile. While this example describes the flow controller 106A as reducing the token count upon receiving packets, increasing the token count at the refresh rate, and considering packets out of profile when the token count falls below the threshold, in another example embodiment, the flow controller 106A may increase the token count upon receiving packets, reduce the token count at the refresh rate, and consider packets out of profile when the token count rises above a threshold.

The token count may correspond to a specified number of bytes. For example, each unit (which may be referred to as a "token") in the token count may indicate a certain number or fraction of bytes (or bits). The refresh rate may be represented as a certain token count that is added to the token count per unit of time, and may be converted into a number of bytes added to the token count per unit of time. Tokens may be added once per second, per millisecond, per microsecond, or any fraction thereof, according to various example embodiments. For example, a token may be added once every 7.8125 microseconds, or 128,000 times per second. The packet size may be converted into the equivalent number of tokens, and then the tokens may be subtracted from the token count, according to an example embodiment.

In an example embodiment, it may be desirable to change the maximum bucket size and/or refresh rate to accommodate network devices with different capacities. The flow controller 106A (or any other flow controller, such as the flow controllers 106B, 106C) may change the maximum bucket size and/ or refresh rate by changing the number (or fraction) of bytes represented by each token, according to an example embodiment. For example, the flow controller 106A may receive user input to change the number of bytes represented by each token.

In the example shown in FIG. 1A, the switch 100 may include a user input 110. The user input 110 may be configured to receive input from a user, such as a user programming the switch 100. For example, the flow controller 106A may receive a token units instruction from the user via the user input 110. When the flow controller 106A receives a packet, the flow controller 106A may decrease the token count based on the size of the packet and the instruction. In an example in which the size of the packet (in tokens) is represented by a binary number, the flow controller 106A may, after converting the packet size (e.g., in bytes) to tokens, shift bit positions of the size of the packet based on the instruction. In this example, the packet size (as represented by a number of tokens) may be increased or decreased in multiples of two based on the instruction. This shifting of the packet size based on the instruction may effectively change the size of the packet represented by the bucket size or token unit, the maximum bucket size, and the refresh rate, according to an example embodiment.

In an example embodiment, the flow controller 106A may include a regulator 112. The regulator 112 may receive the packets which are received by the flow controller 106A. The regulator 112 may also store the packets for forwarding to a network device, such as via the bus 108 and/or the output port 104. The regulator 112 may, for example, convert the packet size into a number of tokens. The regulator 112 may also request tokens from a token bucket 114. The regulator 112 may request the tokens from the token bucket 114 in response to receiving a packet. The request may be based on the size of the packet. For example, the request may be for the number of tokens equivalent to the size of the packet. The regulator 112 may also receive a message from the token bucket 114. The message received from the token bucket 114 may be based on a token count maintained by the token bucket. The regulator 112 may perform actions on the stored packet(s) based on the received message. For example, if the message indicates that a packet is in profile, then the regulator 112 may forward the packet unmarked, or may forward the packet after marking the packet as in profile, such as adding or modifying a field (which may be represented by a color, such as green) indicating that the packet is in profile. In another example, if the message indicates that the packet is out of profile, then the regulator 112 may drop the packet, or may forwarding the packet after marking the packet as out of profile, such as by adding or modifying a field (which may be represented by a color, such as yellow or red) indicating that the packet is out of profile.

Figure 1B:
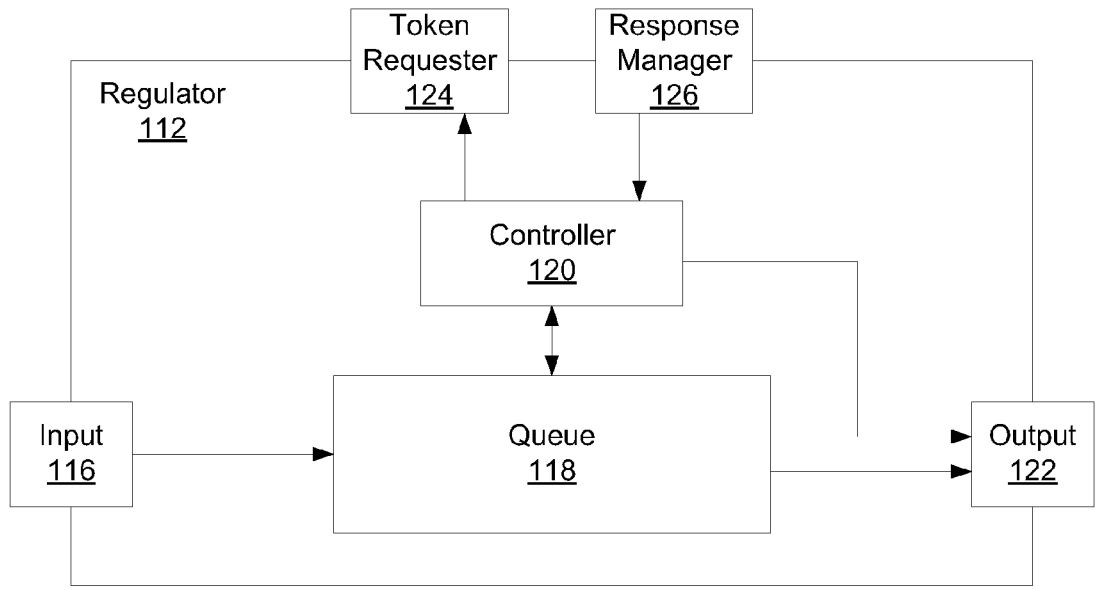
FIG. 1B is a block diagram showing a regulator according to an example embodiment.

FIG. 1B is a block diagram showing the regulator 112 according to an example embodiment. In this example, the regulator 112 may include an input 116. The input 116 may be configured to receive packets sent to the regulator 112. The input 116 may, for example, include a port. The input 116 may forward received packets to a queue 118.

The regulator 112 may include the queue 118. The queue may store packets received by the regulator 112 and forwarded to the queue 118 by the input 116. The queue 118 may, for example, include volatile or non-volatile memory. The queue may store packets until instructed to erase, or drop, or write over the packets by a controller 120. The queue 118 may allow the controller 120 to modify the packets, such as by marking the packets as in profile or out of profile, according to an example embodiment. The queue 118 may also forward the packets to an output 122. The queue may forward the packets to the output 122 based on an instruction from the controller 120.

The regulator 112 may include the output 122. The output 122 may be configured to receive packets from the queue 118 and/or the controller 120. The output 122 may, for example, include a port. The output 122 may forward received packets to a network device, such as via the bus 108 and/or the output port 104.

The regulator 112 may include the controller 120. The controller 120 may control functions of the regulator 112. For example, the controller 120 may instruct the queue 118 to continue to store a packet(s), to forward a packet, to drop or erase a packet, or to write over a packet. In an example embodiment, the controller 120 may also modify packets by marking the packets as in profile or out of profile before instructing the queue 118 to forward the packets. In another example embodiment, the controller 120 itself may forward a packet (marked or unmarked) to the output 122, and may instruct the queue 118 to drop or erase the forwarded packet(s).

The controller 120 may determine the number of tokens to request from the token bucket 114 based on the packet size. For example, the controller 120 may determine the packet size by examining the packet in the queue 118. The controller 120 may then convert the packet size into an equivalent number of tokens. The controller 120 may convert the packet size into the equivalent number of tokens based in part on the user input or token count units instruction, or the controller may convert the packet size into the equivalent number of tokens independently of the user input or token count units instruction and rely on the token bucket 114 to change the number of tokens based on the user input or token count units instruction.

The controller 120 may request the tokens from the token bucket 114. The controller 120 may, for example, request the tokens from the token bucket 114 via a token requester 124. For example, the controller 120 may send a message to the token requester 124 indicating the number of tokens requested. The token requester 124, which may be coupled to the token bucket, may, in response to receiving the message from the controller 120, send a message to the token bucket 114 requesting the tokens from the token bucket 114.

The controller 120 may also receive a message from the token bucket 114 based on the token count. The message received from the token bucket 114 may indicate whether the packet(s) are in profile or out of profile. In an example embodiment, the controller 120 may receive the message via a response manager 126. The response manager 126 may be coupled to the token bucket 114, and may receive the message from the token bucket 114. The response manager 126 may forward to the controller the message indicating whether the packet(s) are in profile or out of profile, according to an example embodiment.

Figure 1C:
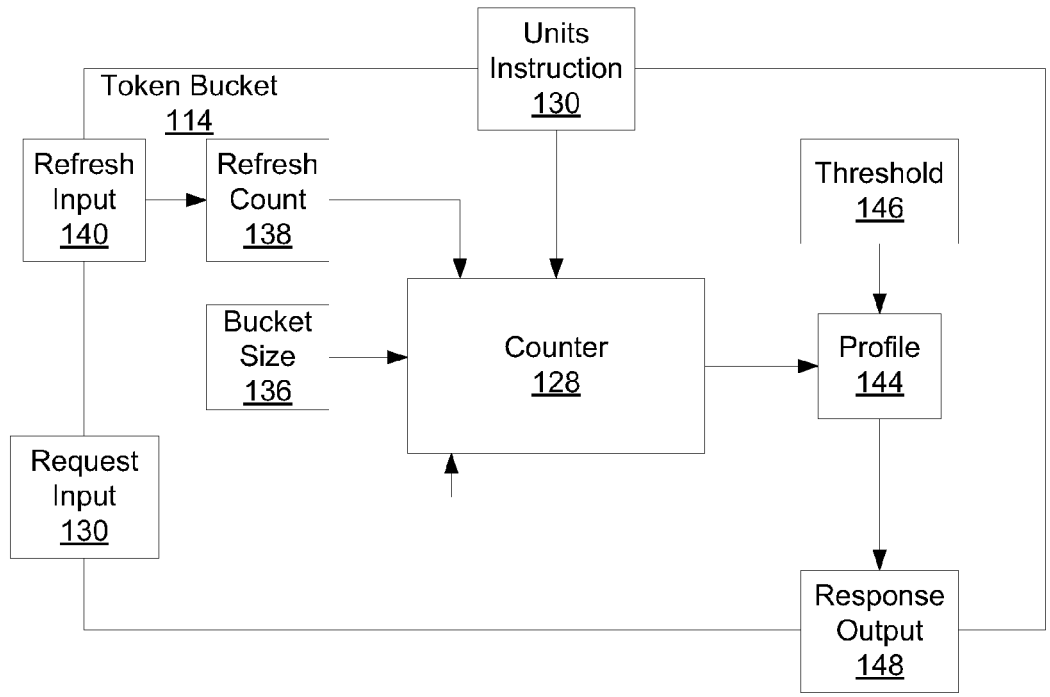
FIG. 1C is a block diagram showing a token bucket according to an example embodiment.

FIG. 1C is a block diagram showing the token bucket 114 according to an example embodiment. The token bucket 114 may, for example, include a counter 128 configured to maintain a token count. The token count may include a number of tokens or credits available to the regulator 112. The counter 128 may, for example, periodically increase the token count according to the refresh rate, and decrease the token count based on receiving token or credit requests from the regulator 112. The counter 128 may, for example, receive the requests from the regulator 112 via a request input node 130. The request input node 130 may be coupled to the token requester 124, and may receive from the token requester 124 the messages requesting tokens.

In an example embodiment, the counter 128 may decrease the token count based on the number of tokens requested by the regulator 112, and based on the token units instruction. The counter may, for example, modify the number of tokens requested based on the token units instruction. For example, if the number of tokens requested is represented as a binary number, the counter 128 may shift bit positions of the number of requested tokens based on the token units instruction. In an example embodiment, the counter 128 may receive the token units instruction via a units instruction node 130. The units instruction node 130 may be coupled to the user input 110 (shown in FIG. 1A), and may forward the token units instruction to the counter 128.

The counter 128 may maintain a maximum bucket size. The maximum bucket size may include a maximum token count for the counter 128 and the token bucket 114. The maximum bucket size may prevent the token count from exceeding the maximum bucket size regardless of the refresh rate. The maximum bucket size may set a limit on the bursty traffic which the flow controller 106A will allow to exceed the maximum average rate of data flow. In the example shown in FIG. 1C, the token bucket 114 may include a bucket size field 136. The bucket size field 136 may store the maximum bucket size for the counter 128 and/or the token bucket 114. The bucket size field 136 may be programmable using software, or may hold a fixed value, according to example embodiments.

The counter 128 may periodically increase the token count according to a refresh count. The refresh count may represent the number of tokens by which the counter 128 increases the token count at each time interval. In the example shown in FIG. 1C, the token bucket 114 may include a refresh count field 134. The refresh count field 138 may store the number of tokens by which the counter 128 increases the token count at each refresh interval. The refresh count field 138 may be stored as a nineteen-bit binary number, according to an example embodiment. The refresh count field 138 may be programmable using software, or may hold a fixed value, according to example embodiments. The refresh count field 138 may also provide an input to the counter 128 prompting the counter 128 to increase the token count by the value of the refresh count. In the example shown in FIG. 1C, the refresh counter field 138 may prompt the counter 128 to increase the token count upon receiving an input from a refresh input 140. The refresh input 140 may be coupled to a refresh generator 142 (shown in FIG. 1A), and may provide periodic inputs to the refresh count field 138, such as every 7.8125 microseconds or 128,000 times per second. The refresh generator 142 may control the refresh rate of the flow controller 106A and/or the counter 128, such as by providing inputs which prompt the counter 128 to increase the token count, and/or by controlling the refresh count stored by the refresh count field 138. The refresh generator 142 may, for example, be coupled to a clock (not shown). The refresh rate may be equal to the refresh count multiplied by the frequency of prompts from the refresh count field 138.

The token bucket 114 may also include a profile field 144. The profile field 144 may indicate whether a packet is in profile or out of profile. The profile field 144 may indicate whether the packet is in profile or out of profile based, for example, on the token count stored by the counter 128. The profile field 144 may also indicate whether the packet is in profile or out of profile based on whether the token count exceeds, is less than, is equal to or greater than, or is equal to or less than, a threshold. In the example shown in FIG. 1C, the token bucket 114 may include a threshold field 146. The threshold field 146 may store the threshold which is used to determine whether the packet is in profile or out of profile.

The threshold field 146 may be programmable using software, or may hold a fixed value, such as zero, according to example embodiments. The profile field 144 may indicate whether the packet is in profile or out of profile based, for example, on the token count stored by the counter 128 and the threshold stored by the threshold field 146.

The token bucket 114 may send the message to the regulator 112 indicating whether the packet is in profile or out of profile. In an example embodiment, the message may be sent based on the indication of the profile field 144. In the example shown in FIG. 1C, the token bucket 114 may include a response output node 148. The response output node 148 may be coupled to the regulator 112, such as to the response manager 126 of the regulator 112. The response output node 148 may send the regulator 112 a message indicating whether the packet is in profile or out of profile based, for example, on the profile field 144.

Figure 1D:
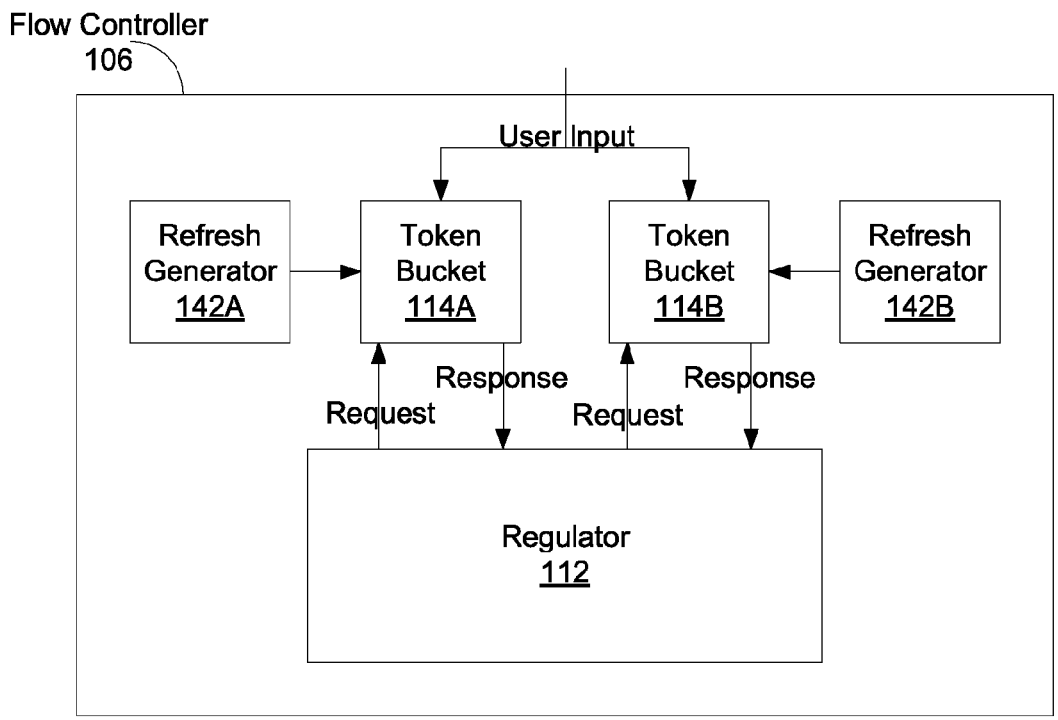
FIG. 1D is a block diagram showing a flow controller according to another example embodiment.

FIG. 1D is a block diagram showing a flow controller 106 according to another example embodiment. In this example, the flow controller 106 may include two token buckets 114A, 114B. The two token buckets 114A, 114B may, for example, have different refresh rates, maximum bucket sizes, and/or thresholds. The two token buckets 114A, 114B may each be associated with a respective refresh generator 142A, 142B, which may have different frequencies of input prompting the token buckets 114A, 114B to increase their respective token counts.

In an example embodiment, the regulator 112 may, upon receipt of a packet(s), request tokens from each of the token buckets 114A, 114B. The regulator 112 may receive responses from each of the token buckets 114A, 114B indicating whether the packet(s) are in profile or out of profile according to the respective token bucket 114A, 114B. According to an example embodiment, the regulator may mark the packet(s) based on whether both, only one, or neither of the token buckets 114A, 114B indicates that the packet(s) are in profile. For example, if both token buckets 114A, 114B indicate that a packet is in profile, then the regulator 112 may mark the packet green. If one of the token buckets 114A, 114B indicates that the packet is in profile, but the other token bucket 114A, 114B indicates that the packet is out of profile, then the regulator 112 may mark the packet yellow. If both of the token buckets 114A, 114B indicate that the packet is out of profile, then the regulator 112 may mark the packet red. This is merely an example, and other methods of marking or modifying packets based on whether the respective token buckets 114A, 114B indicate that the packets are in profile or out of profile may be used.

Figure 1E:
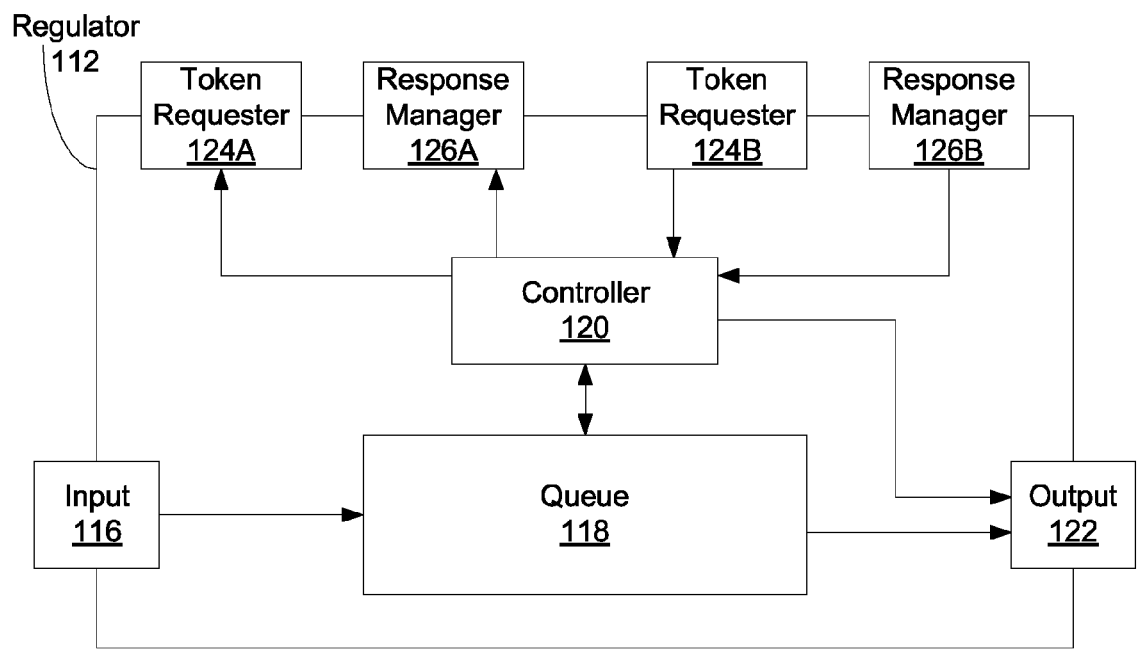
FIG. 1E is a block diagram showing a regulator according to the example embodiment shown in FIG. 1D.

FIG. 1E is a block diagram showing the regulator 112 according to the example embodiment shown in FIG. 1D. In this example, the regulator 112 may include a token requester 124A, 124B associated with each of the token buckets 114A, 114B (shown in FIG. 1D). The regulator 112 may also include a response manager 126A, 126B associated with each of the token buckets 114A, 114B. The token requesters 124A, 124B and response managers 126A, 126B may perform functions as described with reference to FIG. 1B, according to an example embodiment. The controller 120 may perform actions on the packets stored in the queue 118 based on whether the token buckets 114A, 114B indicate that the packets are in profile or out of profile, such as forwarding or instructing the queue 118 to forward the packets, marking the packets (such as according to the example described with reference to FIG. 1D), or dropping the packets.

FIG. 2 is a table showing refresh rates 204, bucket count units 206, bit positions 208, maximum bucket sizes 210, and bucket size units 212 based on a meter granularity parameter 202 according to an example embodiment. This table may, for example, be stored in the token bucket 114. In an example embodiment, the token units instruction may include the meter granularity parameter 202. The meter granularity parameter 202 may include a binary three-bit number which, in decimal form, may have a value between 0 and 7. The meter granularity parameter 202 may determine the bucket count unit 206, which may correspond to the packet size equivalent to one token.

In the example shown in FIG. 2, a token or bucket count unit 206 may correspond to a packet size of between $\frac{1}{128}$ bytes and 1 byte. In an example in which the token units instruction changes the value of a token or bucket count unit 206, the token units instruction may correspondingly change the refresh rate, such as between 8,000 and 1,024,000 bits (or between 1,000 and 128,000 bytes) per second. The regulator 112 or the flow controller 114 may effect the change of the value of the token or bucket count unit 206 by shifting the bit position of the packet size upon which the request for tokens is based.

In the example shown in FIG. 2, the regulator 112 or flow controller 114 may shift the bit position of the packet size between zero and seven positions based on the meter granularity parameter 202 included in the token units instruction. In this example, the table may include a bit position 208 which determines which bit in the bucket count or token count represents a byte of data available to be forwarded through the switch 100 while still remaining in profile. In the example shown in FIG. 2, the bucket count unit 206 is ½ to the power of the number shown in the bit position 208: with a bit position 208 of zero, the bucket count unit is $(\frac{1}{2})^0$ or 1, with a bit position 208 of four, the bucket count unit is $(\frac{1}{2})^4$ or $\frac{1}{16}$, and with a bit position 208 of seven, the bucket count unit is $(\frac{1}{2})^7$ or $\frac{1}{128}$, as examples. In an example in which the token count is stored as a binary number, each byte of data from a packet may cause a request for tokens to subtract a one from the bit position of the token count shown in the bit position 208 (e.g., the request may cause a one to be subtracted from the first bit position, the fourth bit position, or the seventh bit position, as examples). Or, after the size of the packet in bytes has been determined and represented as a binary number, a number of zeroes corresponding to the bit position 208 may be added to the size, and this new number subtracted from the token count, according to an example embodiment.

The meter granularity parameter 202 may also determine a bucket size unit 212. In the example shown in FIG. 2, the bucket size unit 212 may have a value between 512 bytes and 64 kilobytes based on the meter granularity parameter 202. The bucket size unit 212 may be related to the maximum bucket size 210 of the token bucket 114. The maximum bucket size 210 may be a specified multiple of the bucket size unit 212, such as between zero and four-thousand times the bucket size unit 212. In the example shown in FIG. 2, the maximum bucket size 210 may be four-thousand times the bucket size unit 212, and the maximum bucket size 210 may have a value between 2 Megabytes and 256 Megabytes. The maximum bucket size 210 may determine a maximum token count allowed by the token bucket 114 and/our counter 128, according to an example embodiment.

Figure 3:
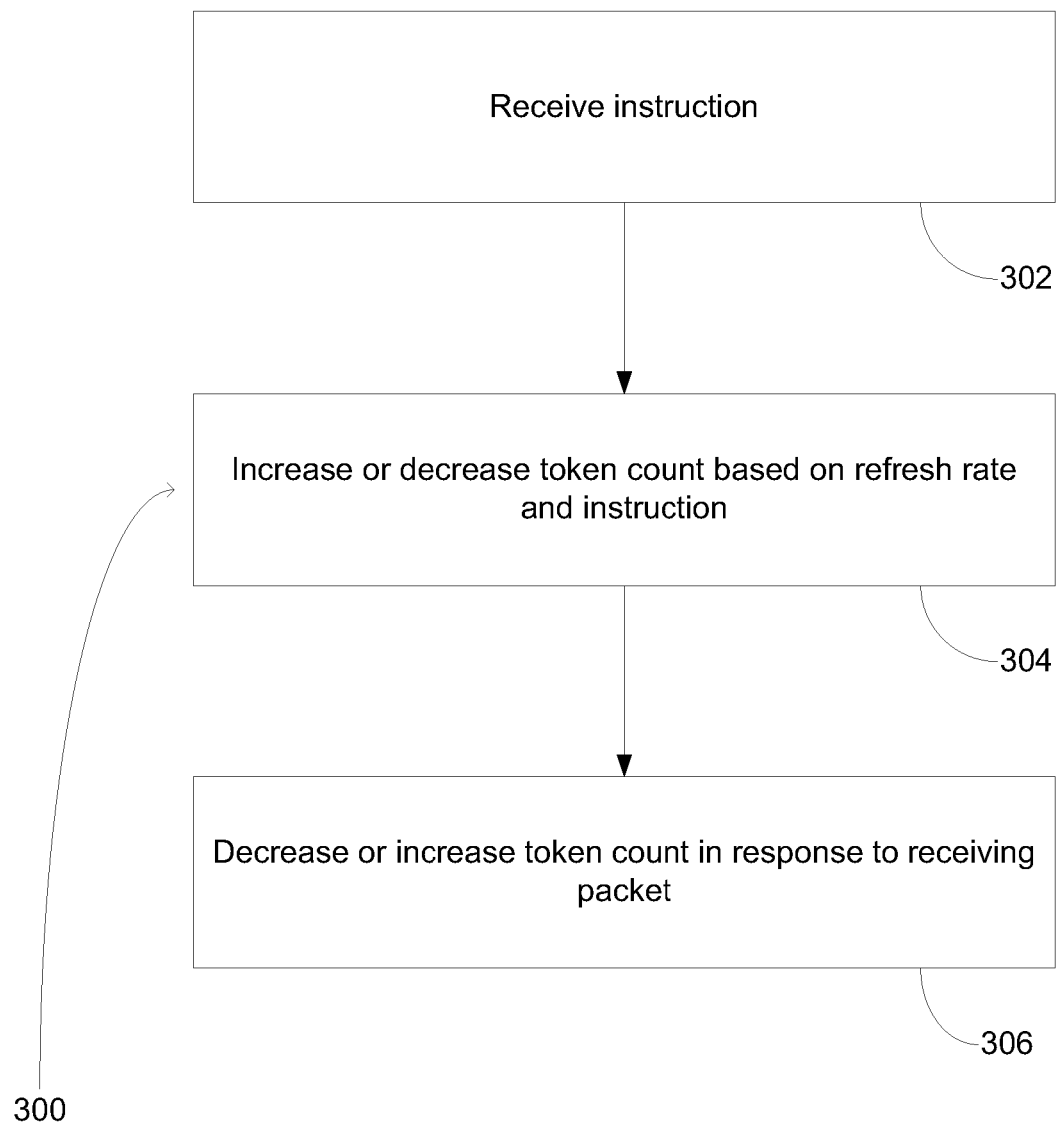
FIG. 3 is a flowchart showing a method according to an example embodiment.

FIG. 3 is a flowchart showing a method 300 according to an example embodiment. In this example, the method 300 may include receiving a token units instruction (302). The method 300 may further include periodically increasing or decreasing a token count based at least in part on a refresh rate (304). The method 300 may also include, in response to receiving a packet, decreasing or increasing the token count based at least in part on a size of the packet and the instruction (306).

In an example embodiment, the receiving the token units instruction (302) may include receiving a three-bit number, such as a meter granularity parameter 202 corresponding to a decimal value between zero and seven.

In another example embodiment, the decreasing or increasing the token count (306) may include shifting bit positions of the size of the packet based on the instruction. This may include shifting bit positions based on a bit position 208 which is based on the token units instruction, for example.

In an example embodiment, the method 300 may further include maintaining a maximum or minimum token count, which may, for example, be based on the maximum bucket size 210.

In an example embodiment, the method 300 may further include sending a message to a regulator 112 based on the token count, such as from a token bucket 114.

In an example embodiment, the method 300 may include receiving the packet. The method 300 may also include forwarding the packet, such as to a network device. The method 300 may also include, in response to receiving a second packet, decreasing the token count based at least in part on a size of the token packet and the instruction.

In an example embodiment, the periodically increasing or decreasing the token count (304) may include increasing the token count based at least in part on the refresh rate, and the decreasing or increasing the token count in response to receiving the packet (306) may include decreasing the token count based at least in part on the size of the packet and the instruction.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
   receiving, by a network switch, a token count units instruction indicating a packet size represented by each token;
   periodically increasing or decreasing a token count based at least in part on a refresh rate; and
   in response to receiving a packet, decreasing or increasing the token count by a number of tokens equivalent to a size of the packet based at least in part on the size of the packet and the packet size represented by each token as indicated by the token count units instruction.

2. The method of claim 1, wherein the receiving the token count units instruction includes receiving a three-bit number indicating the packet size represented by each token.

3. The method of claim 1, wherein the decreasing or increasing the token count includes shifting bit positions of the size of the packet based on the instruction indicating the packet size represented by each token.

4. The method of claim 1, further comprising maintaining a maximum or minimum token count.

5. The method of claim 1, further comprising sending a message to a regulator based on the token count.

6. The method of claim 1, further comprising receiving the packet.

7. The method of claim 1, further comprising receiving and forwarding the packet.

8. The method of claim 1, further comprising, in response to receiving a second packet, decreasing the token count by a number of tokens equivalent to a size of the second packet based at least in part on the size of the second packet and the packet size represented by each token.

9. The method of claim 1, wherein:
   the periodically increasing or decreasing the token count includes periodically increasing the token count based at least in part on the refresh rate; and
   the decreasing or increasing the token count in response to receiving the packet includes decreasing the token count by the number of tokens equivalent to the size of the packet based at least in part on the size of the packet and the packet size represented by each token.

10. An apparatus for use in a network switch for providing flow control comprising:
    a regulator configured to receive packets and request tokens from a token bucket in response to receiving each of the packets, the request indicating a size of the packet; and
    the token bucket, the token bucket being configured to:
      receive a token count units instruction indicating a packet size represented by each token;
      periodically increase or decrease a token count based at least in part on a refresh rate; and
      in response to receiving the request for tokens, decrease or increase the bucket count by a number of tokens equivalent to a size of the packet based at least in part on the size indicated by the request and the packet size represented by each token as indicated by the token count units instruction.

11. The apparatus of claim 10, wherein:
    the regulator is configured to request the tokens from the token bucket in response to receiving each of the packets, the request indicating a size of each of the packets; and
    the token bucket is configured to decrease or increase the bucket count by the number of tokens equivalent to the size of the packet based at least in part on the size of each of the packets and the packet size represented by each token.

12. The apparatus of claim 10, wherein the token bucket is further configured to send a message to the regulator indicating whether each packet is in profile or out of profile based on the bucket count.

13. The apparatus of claim 10, further comprising a user input node configured to receive the instruction and forward the packet size represented by each token to the token bucket.

14. The apparatus of claim 10, wherein the token bucket is configured to:
    periodically increase the token count based at least in part on the refresh rate; and
    decrease the token count by the number of tokens equivalent to the size of the packet based at least in part on the size of each received packet and the packet size represented by each token.

15. The apparatus of claim 10, wherein the regulator is further configured to:
    receive a message from the token bucket based on the token count; and
    forward, drop, or mark the received packets based on the message received from the token bucket.

16. The apparatus of claim 10, wherein the token bucket is configured to shift a bit position of the size of each received packet based on the instruction.

17. The apparatus of claim 10, wherein the token bucket is configured to:
    receive the token count units instruction, the token count units instruction including a three-bit binary number indicating a packet size represented by each token;

periodically increase or decrease a token count based at least in part on a refresh rate; and in response to receiving the request for tokens, decrease the bucket count by the number of tokens equivalent to the size of the packet based at least in part on a size of at least one of the packets indicated by at least one of the request and by shifting a bit position of the size based on the three-bit binary number.

18. The apparatus of claim 17, wherein the token bucket is configured to shift the bit position of the size based on the three-bit binary number and by checking the three-bit binary number on a table.

19. The method of claim 1, further comprising converting the size of the packet into the number of tokens equivalent to the size of the packet based at least in part on the received instruction.

20. The apparatus of claim 10, wherein the regulator is configured to convert the size of the packet into the number of tokens equivalent to the size of the packet based at least in part on the received instruction.

* * * * *